Feb. 19, 1974 R. D. JOHNSTON 3,793,422
ANGLED CUT-OFF IN BOTTOM OF BLOW MOLD
Original Filed Sept. 12, 1969
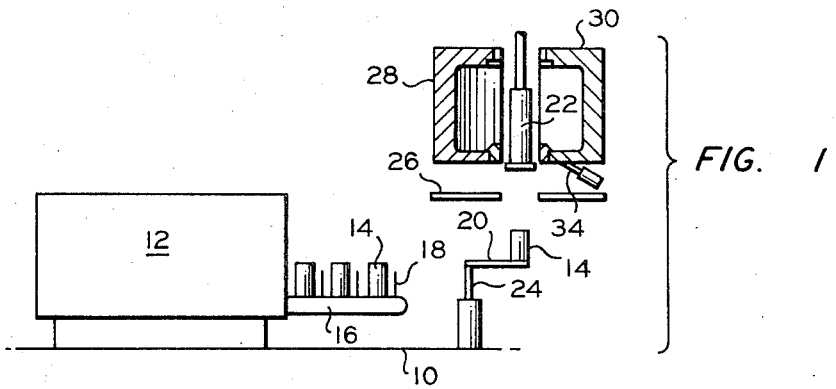
FIG. 1
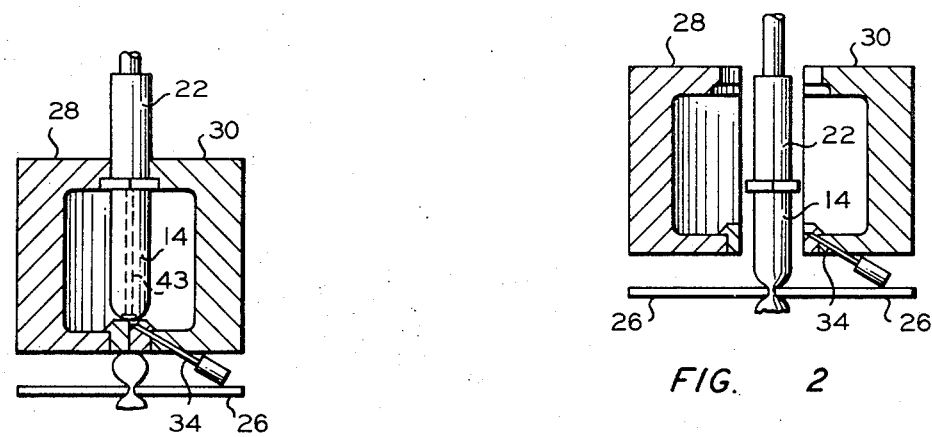
FIG. 3
FIG. 2
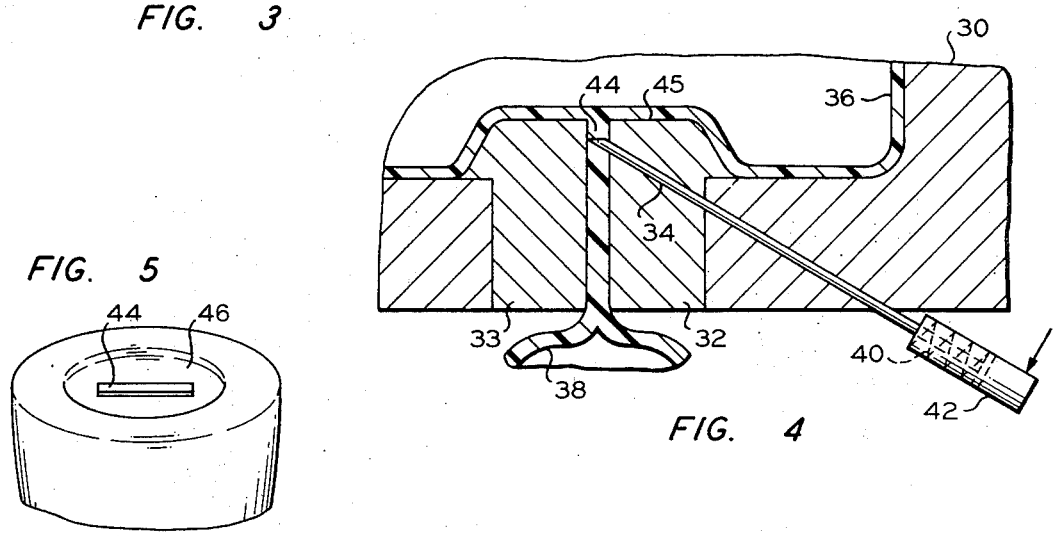
FIG. 5
FIG. 4
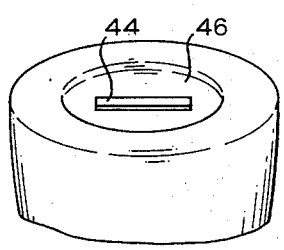
FIG. 6
INVENTOR.
R. D. JOHNSTON
BY Young & Quigg
ATTORNEYS

United States Patent Office 3,793,422
Patented Feb. 19, 1974

3,793,422
ANGLED CUT-OFF IN BOTTOM OF BLOW MOLD
Richard D. Johnston, Bartlesville, Okla., assignor to
Phillips Petroleum Company
Original application Sept. 12, 1969, Ser. No. 857,420, now
Patent No. 3,632,262, dated Jan. 4, 1972. Divided
and this application Sept. 7, 1971, Ser. No. 178,214
Int. Cl. B29c 17/07, 17/10
U.S. Cl. 264—99                                         6 Claims

ABSTRACT OF THE DISCLOSURE

Mold parts are closed about a preformed parison pinching it shut at one end preparatory to blow molding it to a hollow article. A cut-off blade slides within one mold part at an angle so as to enable it to sever the parison at a point adjacent the seal line of the article being formed. This arrangement allows pinching shut parisons made of crystalline materials such as 1-olefin polymers, which parisons have been heated to a temperature just below the crystalline melting point, in such a manner that a good seal is obtained with the seal line being in an indented portion of the bottom; thus the bottle will sit flat on a surface.

BACKGROUND OF THE INVENTION

This is a divisional of my copending application Ser. No. 857,420 filed Sept. 12, 1969, now Patent No. 3,632,-262.

This invention relates to an improved method of sealing and severing parisons of crystalline thermoplastic material preparatory to blow molding.

The most economical manner for forming parison preforms is to continuously extrude a length of tubing and cut it into individual pieces of the proper length. The stretching and forming operation must take place at a temperature just below the crystalline melting point in order to take advantage of the molecular orientation effect. Thus, if the advantages of molecular orientation are to be achieved along with the advantages of producing the parisons by continuous extrusion of tubing, as opposed to injection molding a closed end parison, some means must be devised to effect a good seal of the parison at this temperature which is below its crystalline melting point. Turner, U.S. 3,390,426, discloses sealing such parisons by means of multiple pointed members moving radially toward a point with a tamping foot within the parison which presses against the closed radial members. From the standpoint of simplicity, the ideal arrangement would be simply to close a mold on the parison with a configuration at the bottom of the mold which would seal and sever the parison in a manner similar to that utilized in conventional blow molding. However, since the polymer is at such a low temperature that it will not flow, this does not yield a satisfactory seal.

SUMMARY OF THE INVENTION

It is an object of this invention to provide for sealing and severing a crystalline thermoplastic parison at orientation temperature while said parison is in a mold.

According to this invention, mold parts are clamped on a temperature-conditioned parison to seal the walls of said parison together at a bottom end of said mold, said thus sealed-off end thereafter being severed from the remainder of said parison by a cut-off means in said bottom of said mold, said cut-off means traveling at an angle to a bottom wall-forming surfaces of said mold.

BRIEF DESCRIPTION OF THE DRAWINGS

In the drawings, forming a part hereof, wherein like reference characters denote like parts in the various views, FIG. 1 is a schematic view of a complete blow molding apparatus utilizing the angled cut-off of the instant invention; FIG. 2 is a cross-sectional view of the mold parts with the parison held in the clamping means; FIG. 3 is a view similar to FIG. 2 in a later stage of the operation; FIG. 4 is a detailed view of the bottom portion of the mold parts; FIG. 5 is a perspective view of a bottle molded in accordance with the instant invention; and FIG. 6 is a perspective view of the cut-off member as seen from the top.

DESCRIPTION OF THE PREFERRED EMBODIMENTS

The process and apparatus of this invention are applicable for the formation of biaxially oriented hollow thermoplastic articles such as bottles and other containers, toys, lampshades, and other molded products, and the like.

The invention is particularly applicable to the formation of articles from preformed parisons of orientable crystalline thermoplastic resins which are heated while in their crystalline state to a temperature just below their crystalline melting point, at which temperature molecular orientation and strengthening occurs on stretching. Examples of suitable resins include polymers and copolymers of mono-1-olefins having 2 to 8 carbon atoms and the like. Preferred materials are polymers and copolymers of ethylene, propylene, and 1-butene, with polypropylene being especially preferred.

These polymers are extruded or molded into parison preforms and then cooled to a temperature below their crystalline freezing point. The parisons are then heated to an orientation temperature which is generally about 1–50° F., preferably 2–20° F., below their crystalline melting temperature. The crystalline melting point can be determined by heating a sample of the material under a polarizing microscope. The specimen is heated slowly and the point at which the last birefringence disappears is the crystalline melting point.

Following conventional technology, references to "crystalline" polymers means solid polymers normally having a high degree of crystallinity, that is, at least 50 percent, as determined by X-ray analysis or comparable methods.

In accordance with this invention, the parison walls are sealed by means of pressing them together from the side by the bottom portions of the mold halves as they close. After the walls of the parison have been pressed together to form a seal, a severing means slides at an angle through one of the mold halves to sever the parison, leaving a small tab of the sealed-together parison attached to the article. By having the cut-off mechanism slide at an angle, the mold can be so contoured as to form a recess in the bottom of the bottle so that the tab can project downwardly and yet not interfere with the bottle sitting level on a flat surface.

Referring now to FIG. 1, there is shown a blow molding apparatus comprising a frame 10. Supported by the frame is an oven 12. Parisons 14 are conveyed through this oven by means of a continuous chain 16 carrying support pins 18. Heated parisons 14 are lifted off of support pins 18 by means of a transfer mechanism comprising a pivotal and laterally reciprocal arm 20. The parisons are grasped by arm 20 at the bottom end thereof, lifted upwardly over the support pin, transferred laterally to a position under thread-forming jaw 22, and then moved upwardly by means of the extension of cylinder 24, which carries transfer arm 20. The upper end of parison 14 is thereby positioned within thread-forming jaw 22, and this jaw then closes about said parison to clamp it securely and in so doing, to form the threads in the case of a bottle. Transfer arm 20 is then withdrawn and the bottom end of parison 14 grasped by means of gripping elements 26 which are also carried by frame 10.

Gripping elements 26 hold the bottom end of parison 14 securely as thread-forming jaw 22 raises to thereby stretch and molecularly orient parison 14 in a longitudinal direction. Thread-forming jaw 22 retracts to a position flush with the inner surface of the article-forming cavity, formed by mold halves 28 and 30, as shown in FIG. 3. Mold halves 28 and 30 have inserts 32 and 33 designed to form a recess in the bottom of the article being molded. As can be seen from a view of FIGS. 3 and 4, as the mold halves close, the parison wall is pinched flat and squeezed securely together by means of inserts 32 and 33.

After the parison walls have been forced together under pressure to effect a seal, cut-off member 34 slides at an angle through mold half 30 and insert 32 to sever the portion of the parison forming article 36 from the scrap portion 38 as shown in FIG. 4. Cut-off member 34 is a generally flat blade-like member with a pointed edge which abuts against the insert member 33 carried by the opposite mold half. It is held in a retracted position by spring 40 and is forced forward by means of air cylinder 42. In FIG. 4, obviously, the process is shown at a later stage from that of FIG. 3, at which later stage the parison has been blown out into conformity with the mold walls. Cut-off member 34 may be actuated any time after inserts 32 have pressed the walls of the parison together to effect a seal. That is, it may be actuated before the blow pressure has been introduced into the parison, or after the blow pressure has been introduced. In either event, the inserts 32 and 33 form a recess in the bottom of the container so that the small tab 44 will not preclude the article from sitting flat on a level surface.

Cut-off member 34 contacts the portion of mold half 28 represented by insert 33 at a point spaced downwardly from bottom forming surface 45 a distance of from 1/100 to 1/2 inch, preferably 1/64 to 1/16 inch, to thus form a tab of corresponding length.

Gripping elements 26 can be retracted if desired after the mold closes. Particularly in an alternate embodiment such as is shown in FIG. 3 where a tamping foot 43 presses against the seal from the inside, this may be necessary to allow some movement of the tail portion as the cut-off member 34 severs the flattened portion of the parison. Cut-off member 34 may completely sever the tail from the remainder of the parison so that it falls free on opening the mold, or a thin web may connect it to the article which has been molded; this web can be easily broken, for instance, by leaving the gripping elements 26 engaged and moving them relative to the article.

FIG. 5 shows a perspective view of the bottom of a bottle formed using the instant invention. Within recess 46 of the resulting container, which recess is formed by inserts 32 and 33, there is shown tab 44. Sliding cut-off member 34 is of a width essentially equal to the length of tab 44.

It is essential that sliding cut-off member 34 be positioned at an angle so as to allow the cutting operation to take place in a recessed area; otherwise, the parison would have to be severed exactly flush with the bottom surface of the article, which would be difficult to do and which would result in a weak seal with the type of polymer in question, that is, a crystalline polymer at a temperature below its crystalline melting point.

It is further essential that the cut-off member 34 be actuated to sever the parison at a time after the molds have closed and sealed the parison together by the action of inserts 32 pressing the walls tightly together. If the cut-off member 34 were extended as the mold closes so as to sever the parison as it is being sealed, the portion of the parison forming tab 44 would not be pressed together as securely, and therefore, an inferior seal would result. Here again is a step which is critical because of the type of material being sealed. In an ordinary blow molding operation involving a molten or tacky parison, the sealing and severing could occur simultaneously and there could be great leeway in the configuration of the sealing and severing surfaces without affecting the quality of the seal.

It is noted that in this process just described, the mold closes on a portion of the parison which has been stretched. The combination of having the parison stretched prior to closing the mold to seal and activating cut-off member 34 after the walls have been sealed together that provides an exceptional seal. In this regard, it is noted that while the drawings show the stretching occurring by moving the thread-forming head at the top of the mold initially and to stretch the parison by bringing the means holding the bottom downward. Also, the entire operation could be disposed upside down to that shown, or even in a horizontal plane.

In embodiments where the cut-off member 34 is actuated before the parison is blown out against the mold walls, the parison is prevented from retracting by virtue of tab 44 being held between inserts 32 and 33, thus eliminating the need for a tamping foot for this purpose.

Many standard parts such as temperature controllers, relays, fittings, and the like have not been shown in the drawings for the sake of simplicity, but their inclusion is understood by those skilled in the art and is within the scope of the invention.

EXAMPLE I

Propylene homopolymer having a density of 0.905 (ASTM D 1505–63T), a melt flow of 2 (ASTM D 1238–62T, Condition L), and a crystalline melting point of 340° F. was extruded into tubing having an internal diameter of 0.8 inch and a wall thickness of 0.125 inch. The tubing was cooled to room temperature and cut into 7-inch lengths. These 7-inch lengths were heated to a temperature of 320–338° F., grasped at a top end by a thread-forming means such as means 22 shown in the drawings and at the bottom end by a gripping element such as element 26 shown in the drawings. The parison was then stretched by moving the thread-forming head upward as shown in FIG. 3 of the drawings. Mold sections were then closed as shown in FIG. 3 of the drawings to pinch the parison shut and seal the walls along the bottom of the mold. After the mold halves were completely closed, sealing the walls of the parison shut along a flattened area, a flat blade moving within the mold wall as shown in the figures was actuated to sever the parison so as to separate the body portion from the tail. Thereafter the blow air was introduced to form the parison against the mold walls thus effecting circumferential molecular orientation as is shown in FIG. 4. The molds were opened and the resulting 28-ounce bottle removed. The bottle had a tab such as tab 44 shown in the drawing depending from the bottom surface of the recessed portion of the bottom about 1/32 of an inch. This bottle was found to have a water-tight seal.

EXAMPLE II

A number of bottles were made exactly in accordance with the description of Example I and tested for a water-tight seal. One hundred percent of the bottles were found to have a water-tight seal.

While this invention has been described in detail for the purpose of illustration, it is not to be construed as limited thereby, but is intended to cover all changes and modifications within the spirit and scope thereof.

I claim:

1. A process for forming hollow articles comprising: heating an open-ended hollow parison of a crystalline thermoplastic olefin polymer to a temperature within 1–50° below a crystalline melting point of said polymer; stretching said thus heated parison while at a temperature between 1 and 50° below said crystalline melting point of said olefin polymer to effect longitudinal molecular orientation; closing a mold about said heated parison and thereby pressing the walls of said parison together at a bottom wall forming end thereof to form a sealed area; thereafter severing said parison at a point within said sealed area so as to separate a tail portion from the remainder of said parison, said severing being accomplished at a point so spaced as to leave a tab on said remainder of said parison having a length of 1/100 to 1/4-inch; introducing blow air to form said parison against said mold thus affecting circumferential molecular orientation and forming a hollow article having a recess in the bottom thereof, said tab being within said recess and shorter than the depth thereof; and removing the resulting article.

2. A method according to claim 1 wherein said severing is effected at a point so spaced as to leave a tab of about 1/64 to 1/16 inch.

3. A method according to claim 1 wherein said polymer is heated to a temperature of 2–20° below the crystalline melting point in an air oven prior to stretching.

4. A method according to claim 1 wherein said polymer is a polymer of at least one mono-1-olefin having 2–8 carbon atoms per molecule.

5. A method according to claim 1 wherein said olefin polymer is polypropylene and wherein said polypropylene is heated to a temperature of 320–338° F. prior to said stretching.

6. A method according to claim 5 wherein said sealed area is flat and said parison is at a temperature of 320–338° F. during said stretching.

References Cited

UNITED STATES PATENTS 3,592,885  7/1971  Goins et al. _____ 264—94 X

FOREIGN PATENTS 911,228  11/1962  Great Britain _____ 264—98
957,010  4/1964  Great Britain _____ 264—161

JEFFERY R. THURLOW, Primary Examiner

J. H. SILBAUGH, Assistant Examiner

U.S. Cl. X.R.

264—161, 163